United States Patent Office.

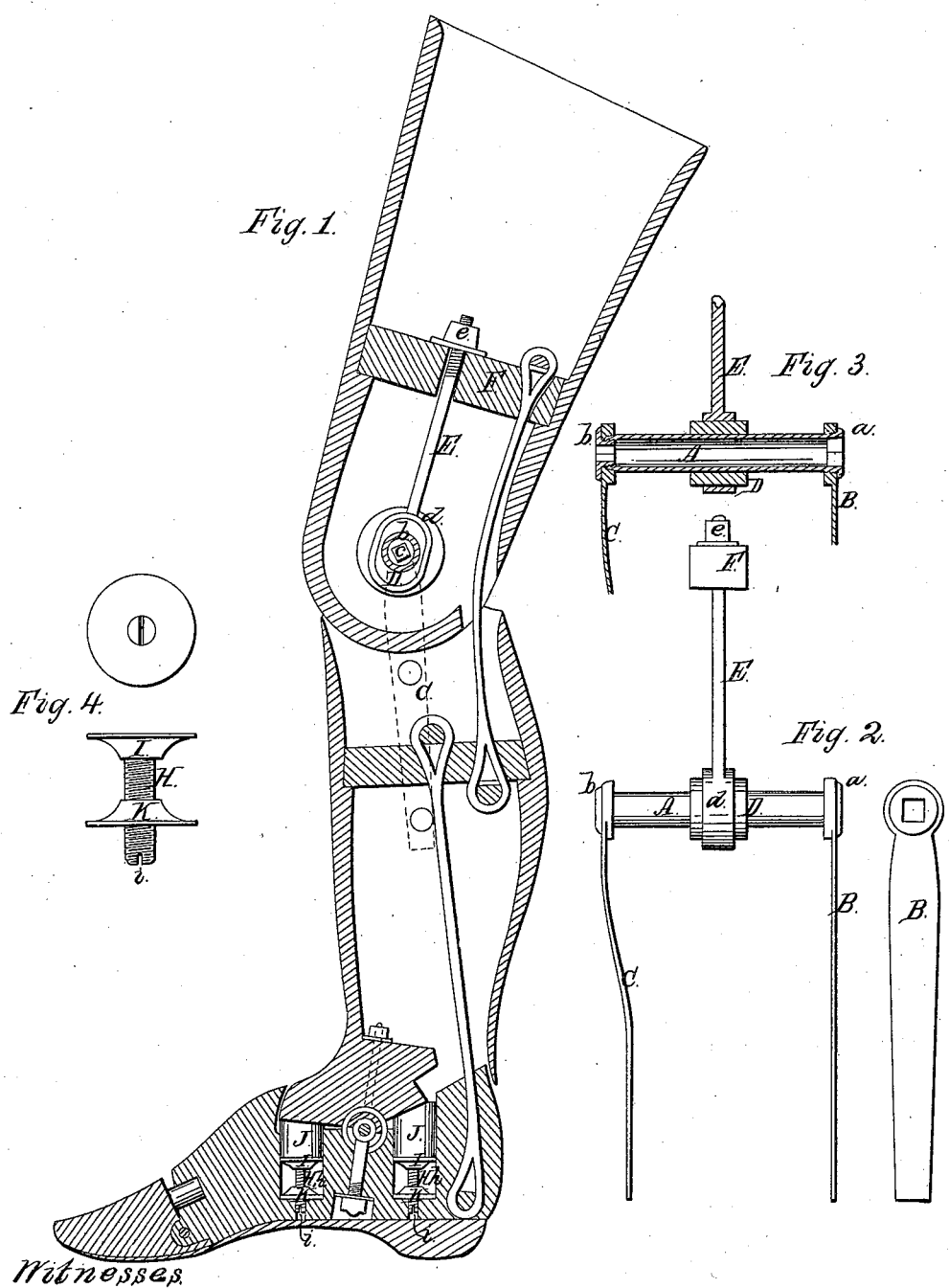

JAMES A. FOSTER, OF DETROIT, MICHIGAN.

Letters Patent No. 92,031, dated June 29, 1869.

IMPROVED ARTIFICIAL LEG.

The Schedule referred to in these Letters Patent and making part of the same.

*To whom it may concern:*

Be it known that I, JAMES A. FOSTER, of Detroit, in the county of Wayne, and State of Michigan, have invented a new and useful Improvement in Artificial Legs; and I do declare that the following is a true and accurate description thereof, reference being had to the accompanying drawings, and to the letters of reference marked thereon, and being a part of this specification.

Figure 1 is a vertical section, showing the interior arrangement of the parts forming the operating-parts of the leg.

Figure 2 is a plan view of my hollow knee-bolt and its attachments.

Figure 3 is a horizontal section of said bolt.

Figure 4 is a representation of my adjusting-screws, to regulate the springs, either in front or rear of the ankle-joint.

Like letters indicate like parts in each figure.

The nature of this invention relates to an improvement in the construction of artificial legs; and consists, first, in a new and peculiar construction of a hollow knee-bolt, so arranged that it may be easily kept tight, thereby preventing unnecessary wear and rattling; and, secondly, in a novel arrangement for adjusting the ankle-springs, so as to give an easy and natural motion to the foot. This is done by a proper set-screw, as is hereinafter described.

A, in the drawings, represents a hollow or tubular bolt, provided with a flanged head, *a*, and a suitable thread, immediately adjoining said head, which fits and screws into the female screw of the plate B.

The opposite end of this bolt A is made slightly conical upon the outside periphery, and is designed to fit into a conical opening through the head of the plate or strap C.

The interior of this end of the bolt A is tapped out, and fitted with a flanged hollow nut, *b*, provided with a square aperture, *c*, into which a key may be inserted for the purpose of tightening up said nut, and thereby forcing, when required, the head of the plate or strap C more closely upon the conical portion of the end of the bolt A, thereby keeping it firm in place. This bolt passes through the upper portion of the inferior leg and the lower part of the thigh, where the point of juncture forms the knee, and connects the two parts together.

D is a wooden box or bearing, within which the bolt A partially rotates; and

E is an eye-bolt, the eye of which forms a strap, *d*, which encloses or surrounds the box D, while the opposite end of said bolt, passing through the support F, is provided with a proper screw and nut, *e*, by means of which the tension upon the hollow bolt A may be adjusted, and the wear in the bearing D compensated for.

The straps or plates B and C extend downward, and are secured to the inferior leg, as shown in dotted lines in the drawings.

By the above means I am able to obtain a superior knee-joint to any now in use, inasmuch as by the operation of the hollow nut *b*, and nut *e*, as above described, it can at all times be kept, not only tight and free from rattling, but the wear in the bearings can readily be compensated for, while perfect flexibility is secured.

H is a screw, provided with head I, which is designed to engage with and rest against the bottom of the springs J.

K is a proper nut to engage with the screw H, and is designed to be secured at the bottom of the openings *h* in the foot, under the springs.

The lower end of the screw H is provided with a slot, *i*, into which the end of a screw-driver should be inserted, whenever it is desired to adjust the springs J, to produce an even and natural motion of the foot.

What I claim as my invention, and desire to secure by Letters Patent, is—

1. The bolt A, in connection with plates or straps B and C, hollow nut *b*, wooden box or bearing D, eye-bolt E, and support F, and thigh and inferior leg, when constructed and operating substantially as and for the purposes set forth.

2. The screw H, provided with head I, nut K, and slot *i*, in connection with springs J, when constructed, arranged, and operating substantially as and for the purposes specified.

JAMES A. FOSTER.

Witnesses:
JAS. I. DAY,
S. F. TERWILLIGER.